Figure 1:
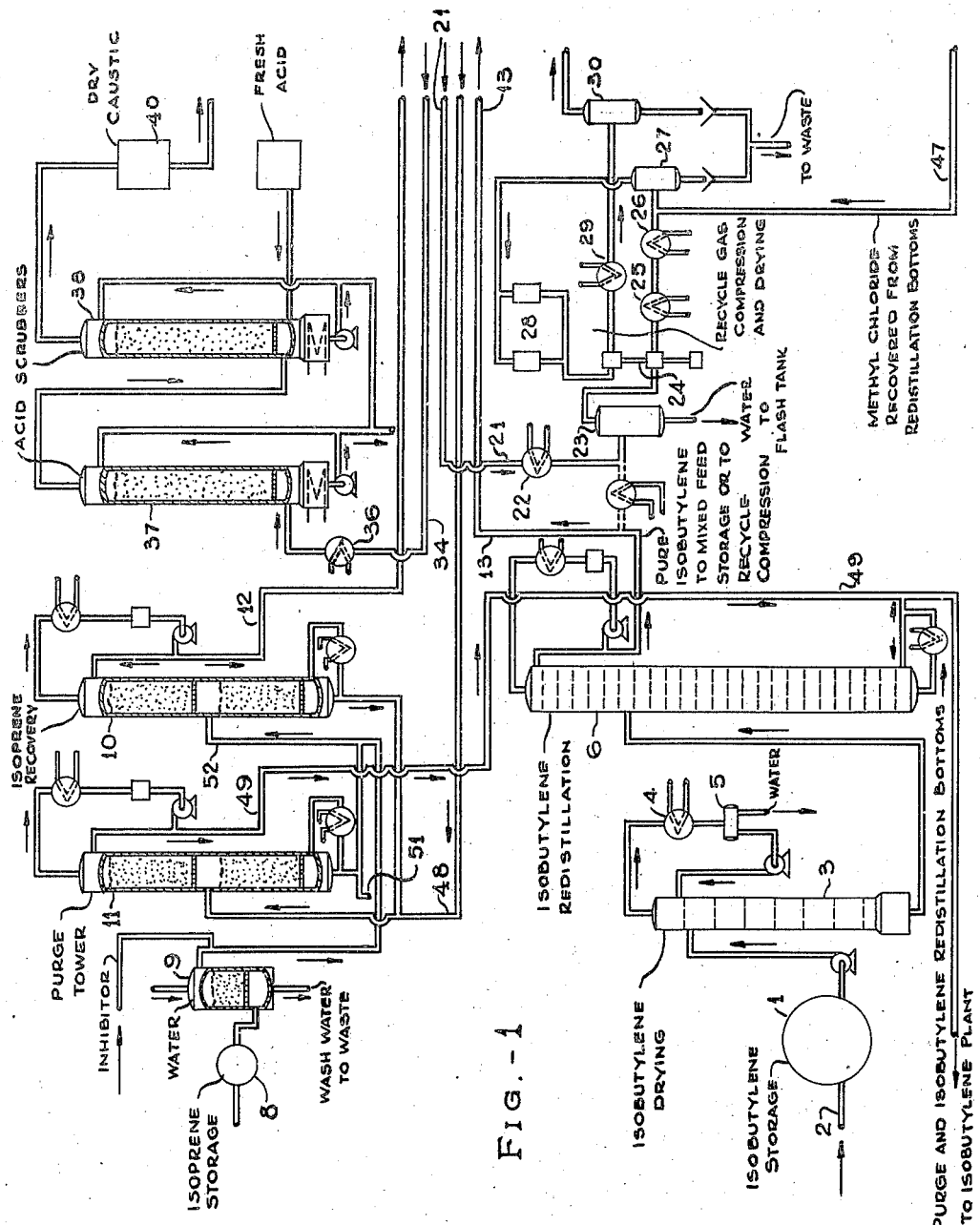

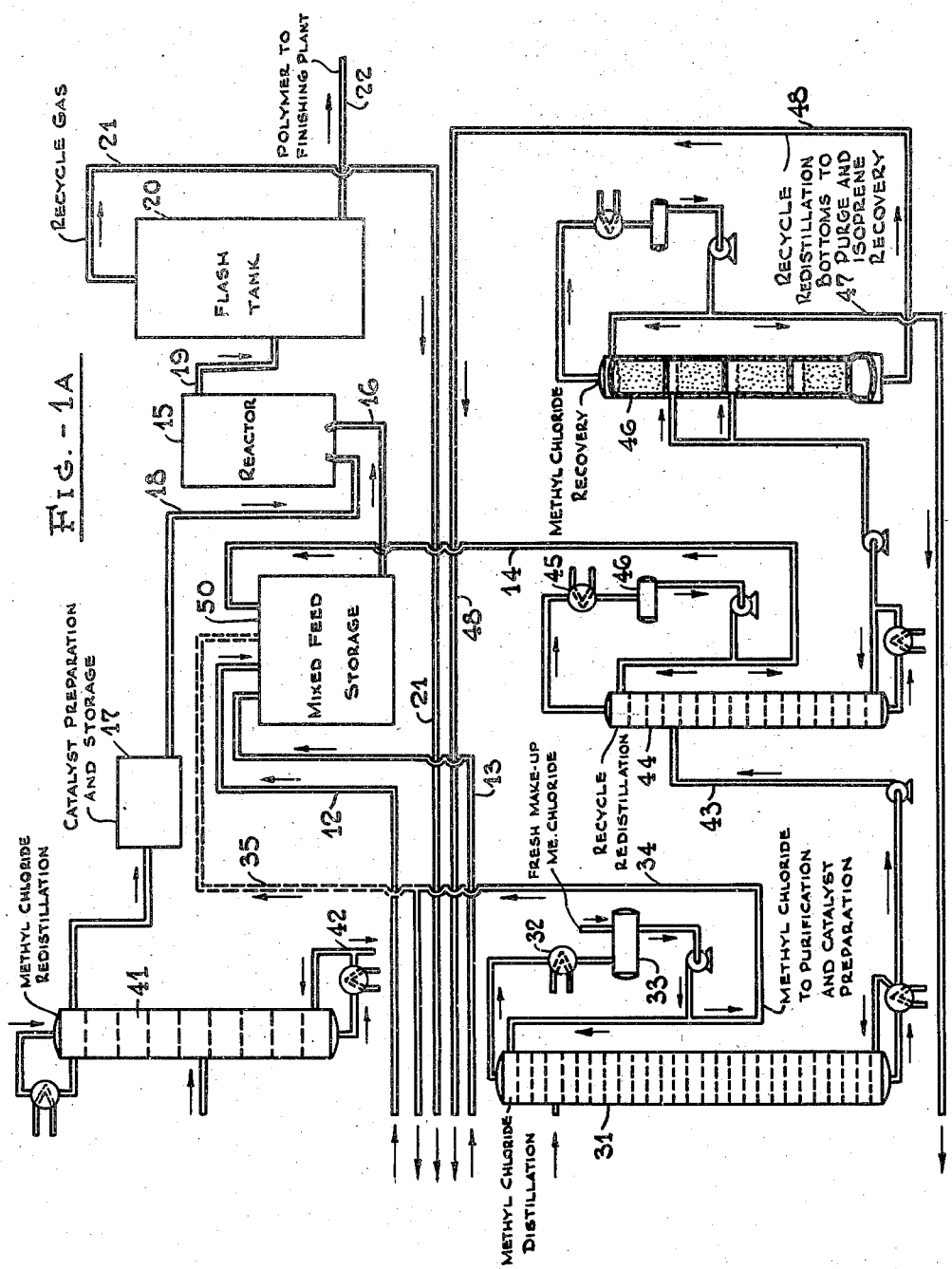

Patented May 7, 1946

2,399,672

UNITED STATES PATENT OFFICE 2,399,672

PROCESS FOR THE PRODUCTION OF HIGH MOLECULAR WEIGHT ISOOLEFINIC POLYMERS

Arthur D. Green, Cranford, Stanley C. Lane, Roselle, and Edward T. Marshall, Cranford, N. J., assignors, by mesne assignments, to Jasco, Incorporated, a corporation of Louisiana Application January 4, 1944, Serial No. 516,912

7 Claims. (Cl. 260—93)

The present invention pertains to the preparation of polymers from isomonoolefins or mixtures of isomonoolefins and diolefins by treatment thereof with Friedel-Crafts type catalysts at low temperatures.

High molecular weight polymers such as polyisobutylene of 15,000–25,000 up to about 300,000 molecular weight (as determined by the Staudinger method) have been prepared by polymerizing isomonoolefins such as isobutylene in contact with a Friedel-Crafts type catalyst at temperatures below −10° C. and preferably below −40° C. Products which are vulcanizable or curable with sulfur are obtained if a minor proportion of a diolefin is added to a major proportion of an isomonoolefin and the resultant mixture is polymerized at temperatures below −10° C. and preferably at or about −100° C. by the application thereto of a solution of a Friedel-Crafts type catalyst in a low-freezing, non-complex-forming solvent such as a lower alkyl halide, carbon disulfide or the like.

As currently conducted, the reaction mixture comprising a slurry of solid polymer particles in varying amounts of diluents or diluent refrigerant in certain instances as well as unreacted olefinic materials is dropped into heated water which serves to volatilize the unreacted olefinic materials, solvents, etc., contained in the reaction slurry or alternatively the reaction slurry is subjected to a screening or filtering operation to separate solid polymer particles from cold reaction liquid which is then recycled to the reaction zone while the polymer particles are dropped into hot water to flash off the volatile liquids that adhere to the polymer. Although the latter procedure effects a considerable reduction in the amount of materials volatilized by this flashing operation, it is necessary for practical operation of either of the foregoing processes to separate and recover the volatilized materials in order that it may be recycled in the process.

The polymerization processes described above are extremely susceptible to "poisoning" by such compounds as water, normal olefins, diolefins, oxygenated compounds such as alcohols, ethers and aldehydes and acidic compounds such as HCl and $SO_2$. These compounds may have one or more of the following deleterious effects on the process, increase catalyst consumption, decrease the molecular weight of the polymer, cause undesirable slurry characteristics and cause "after polymerization." It is, therefore, extremely important that these compounds be held at a low concentration level and preferably at a uniform low level in order that the "activity" of the reactant mixture and the properties of the polymer will not fluctuate. Certain "poisons," such as diolefin, are an essential part of the reaction mixture and while their concentration must not be held too low, their amount must be held constant. Normal butylenes are sometimes desirable in appreciable but constant amounts to cut molecular weight. In addition, the concentration of materials which are not ordinarily considered poisons, such as paraffins, must not be allowed to build up in the system to a point where they exert an excessive diluting effect upon the operation.

It is the object of the present invention to provide the art with a method of recovering and recycling diluents and unreacted materials and the like from a reaction slurry formed in the low temperature polymerization of olefinc materials such as isomonoolefins, or mixtures of isomonoolefins and diolefins.

It is also the object of this invention to provide the art with a method of recovering and recycling diluents and unreacted materials from the above-mentioned processes whereby "poisons" and/or inert materials such as paraffins are removed or maintained at a level sufficiently low as not to interfere with the uniform conduct of the process.

It is a further object of this invention to provide the art with a method whereby the raw materials for the polymerization and the recovered unreacted materials may be treated in the simplest possible manner to keep the concentration of all impurities in the reaction mixture at a low and uniform level.

These and other objects will appear more clearly from the detailed description and claims which follow.

Reference is made to the accompanying drawings illustrating the manner of carrying out the present process. In the drawings, Figures 1 and 1A are a diagrammatic illustration of the recycle and purification system as applied to the recovery of methyl chloride, isobutylene and isoprene from a system in which isobutylene and isoprene are copolymerized in the presence of a Friedel-Crafts type catalyst.

Figure 2:
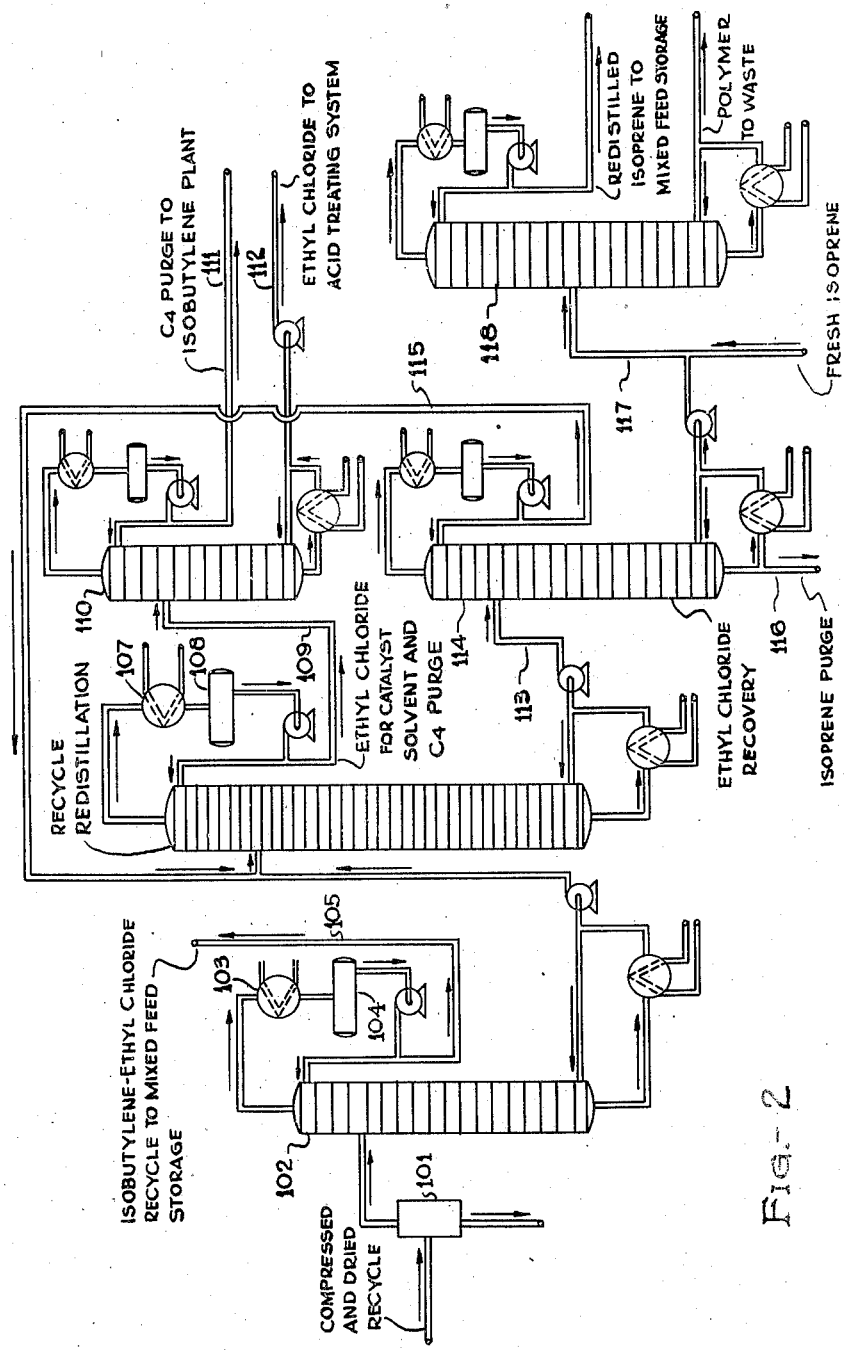

Figure 2 shows part of the recycle system modified to handle ethyl chloride as catalyst solvent and diluent.

In Figures 1 and 1A, 1 designates an isobutylene storage drum to which commercially prepared isobutylene is supplied through line 2. The isobutylene content of this product ordinarily varies between about 92–99%, the remainder comprising isobutane, normal butylenes, trimethylethylene and other C₅ and heavier hydrocarbons, as well as moisture.

Water, although present in very small amounts, is a troublesome impurity because of the fact that it reacts with aluminum chloride and other Friedel-Crafts type catalysts and also causes stoppages due to freezing in small lines, valves, etc. Water is removed from the isobutylene by a simple distillation step, advantage being taken of the fact that when water has only a very low solubility in another liquid, the dissolved water exerts an abnormally high vapor pressure, permitting it to be removed as an overhead product. Water removal is effected by introducing the fresh isobutylene into distillation column 3, all of the water and part of the C₄ light ends such as methane, C₃, etc., if present being taken overhead, the water condensed in cooler 4 and flows into separator drum 5 wherein sufficient settling time is allowed to permit the water in excess of the solubility limit to separate out the methane or other non-condensibles being vented off. Water is removed from the bottom of the settling drum 5 periodically, while the bulk of the condensate is pumped back to the distillation column 3 as reflux.

The bottoms from column 3 are supplied to isobutylene redistillation column 6 wherein fractionation of isobutylene is carried out to provide a feed stock as free as possible of butene-2, C₅ olefins and higher boiling materials. The isobutylene redistillation tower 6 should be designed to reduce the butene-2 content of the isobutylene to 1 mol % or less when bottoms containing about 50 mol % of isobutylene are being withdrawn. Reduction of the butene-1 and the isobutane content would be helpful but is impracticable because of the relative volatilities of these materials compared to isobutylene.

The isobutylene is taken overhead from tower 6, condensed at 7, part of the condensate being pumped back to tower 6 as reflux while the main portion is pumped through line 13 to a storage drum and into the mixed feed storage 50.

Alternatively, the isobutylene may be combined with the recycle gases entering the compression and drying system to be described in detail below.

The diolefin, in the present case isoprene, entering the system is supplied to storage 8. Commercial isoprene contains 85–99% isoprene and usually a low concentration of a polymerization inhibitor such as tertiary-butyl-catechol, hydroquinone, etc. Impurities consist of other C-5 diolefins and olefins, some polymer, and in certain cases oxygenated compounds such as acetone. The fresh isoprene is given a pretreatment by washing the liquid isoprene countercurrently with water in a packed tower 9 to remove at least 90% of the oxygenated compound. The once-through wash water is separated out at the bottom of the tower and is discarded while the washed isoprene overflows at the top. Since the water washing removes most of the inhibitor, fresh inhibitor may be added to the isoprene leaving washer 9 whereupon the isoprene is supplied to distillation column 10 preferably after combination thereof with the recycled isoprene stream from the bottom of the recycle purge tower 11 to be described in greater detail below. The distillation in column 10 serves to remove any polymer which may be present in the fresh make-up isoprene as well as in the recycle stream and to provide a freshly distilled isoprene as feed to the reaction. The fresh isoprene also supplies polymerization inhibitor so that the distillation can be carried out with as little formation of solid polymers as possible. The freshly distilled isoprene is taken overhead from column 10 and is passed through supply line 12 into the mixed feed storage 50.

In addition to the freshly distilled isoprene supplied through line 12 and the purified isobutylene supplied through line 13 the main recycle stream, which will also be described in greater detail below, consisting essentially of methyl chloride, isobutylene with smaller amounts of isobutane as well as normal butenes is supplied to the mixed feed storage through line 14. In order to reduce fluctuations in composition to a minimum, the mixed feed storage is preferably large and with more than one tank in series. The tank also should be provided with mixers. Every effort must be made to maintain constant flows and composition of the inlet and outlet streams, since the reaction is very sensitive to isoprene-isobutylene ratio and to ratio of normal olefins and of oxygenated materials.

The mixed feed is withdrawn from the storage 50 and supplied to the reactor 15 through line 16. Polymerization is effected therein at temperatures below −40° F., preferably at temperatures near the boiling point of ethylene at atmospheric pressure, i. e., −154° F., by the introduction thereinto of a solution of Friedel-Crafts type catalyst such as aluminum chloride in methyl chloride supplied through line 18 from the catalyst preparation and storage system 17. Polymerizations of this type are well known and are described in considerable detail, for example, in Australian Patent No. 112,875, issued July 31, 1941. The solid polymer formed is discharged from reactor 15 preferably continuously as a slurry in reaction liquid comprising methyl chloride, unreacted isobutylene and isoprene as well as smaller amounts of isobutane and other C₄ and C₅ olefinic materials. The slurry is withdrawn through line 19 and is either discharged directly into a flash tank 20 as shown, for example, in the application of A. D. Green, Serial No. 511,699, filed November 25, 1943, or is subjected to a cold filtering operation whereupon the separated polymer particles are discharged into the flash tank as disclosed in the application of A. D. Green and W. J. Paltz, Serial No. 483,882, filed April 21, 1943.

In flash tank 20, the polymer slurry or separated polymer particles are contacted with a large volume of liquid, preferably water, which is heated to about 150° F. The unreacted isobutylene and isoprene as well as the methyl chloride and other lower boiling materials are vaporized by the action of the heated flashing liquid and are taken overhead as recycle gas from flash tank 20 through line 21 while the polymer is removed as a slurry in water or other flashing liquid through line 22 and is passed to the polymer finishing plant, after vacuum stripping to recover dissolved gases.

The flashed vapors or recycle gas withdrawn from the flash tank 20 is saturated with water at about 150° F. and contains valuable reactants, i. e., isobutylene and isoprene and methyl chloride which must be recovered and reused for economical operation and also some equilibrium concentration of the various impurities which are continuously admitted to or formed in the system, i. e., isobutane, normal butylenes, amylenes and possibly some low molecular weight polymers which must be purged in whole or in part in order to prevent their build-up to a point where they can seriously interfere with the proper conduct of the polymerization process. The recycle gas is passed through line 21 to and through condenser 22 wherein ample cooling is provided to bring the recycle gas temperature down to about 100–110° F. The water condensed by this cooling operation is separated in the drum 23 and withdrawn periodically.

In the event that the fresh isobutylene feed is not sufficiently dry, it may, as indicated above, be vaporized and combined with the recycle gas, the separator drum or the line just before the separator drum being a convenient point for introducing the fresh isobutylene. The gases leaving the separator 23 enter the first stage of a two-stage recycle gas compressor 24. The recycle gas leaves the first stage of the compressor at a pressure of about 30 to 40 p. s. i. g. and is cooled, preferably with water as far as possible in cooler 25 and then in an ammonia cooler 26 to reduce its water content to the lowest possible value before proceeding to the adsorber driers 28. Care must be taken to prevent cooling wet methyl chloride gas to the point where hydrates are formed. About 65° F. is a practicable temperature for operation. A knock-out drum 27 is provided in the line between the ammonia cooler 26 and the adsorber driers 28 for removing any water condensed by the water cooler 25 and the ammonia cooler 26. The cool gases leaving knock-out drum 27 are passed, preferably through an alumina filter or the like to remove traces of lubricating oil, then through one of two alumina gel or silica gel driers 28 (the other undergoing regeneration), through a bag filter or the like to remove any possible alumina dust and then to the second stage of the recycle gas compressor 24. The recycle gases leave the second stage of the compressor at a pressure of about 150 p. s. i. g. and are cooled in the after-cooler 29 and separated from entrained lubricating oil in the knock-out drum 30.

The compressed and cooled recycle gases are fed from the knockout drum into methyl chloride distillation column 31. This column serves to permit the continuous withdrawal of a relatively small amount of methyl chloride from the recycle gas stream to serve as a solvent for the aluminum chloride or other Friedel-Crafts type catalyst used as polymerization catalyst. The methyl chloride to be used for catalyst solvent must be practically free from any materials which react with the catalyst such as butylenes, dimers, etc. The more completely methyl chloride can be separated from butylenes by fractionation of the recycle gas, the easier becomes the subsequent treatment required to remove the remainder of this material. The methyl chloride distillation column is operated with the highest practical reflux to obtain as pure a methyl chloride product as possible. The methyl chloride is taken overhead from column 31 condensed in cooler 32 and passed into the reflux feed drum 33. The amount of methyl chloride necessary for the preparation of catalyst solution is pumped from the reflux feed drum through line 34 to the methyl chloride purification system, the remainder of the methyl chloride being returned to the column 31 as reflux.

It is possible, if necessary, to adjust the feed composition in the mixed feed storage 50 by passing the overhead product from column 31 directly into storage 50 by means of line 35. This procedure is used only sparingly, however, so that the maximum reflux ratio may be maintained in column 31.

Fresh make-up methyl chloride is added at intervals to the system and may be effected conveniently by addition at the reflux feed drum 33. Alternatively, it can be added to line 34 whereby it will be subjected to the treating operations provided for the redistilled methyl chloride in order to remove any alcohols or other impurities present therein.

The methyl chloride withdrawn through line 34 for purification and catalyst preparation generally represents only about 10% of the recycle gases but must be purified to such an extent that the concentration of butylenes is no higher than about 100 parts per million and is preferably much lower. The methyl chloride is passed from line 34 through a vaporizer 36 and into the bottom of acid scrubbing towers 37 and 38 wherein it is contacted with 87–98% sulfuric acid. The entire treating operation is carried out in the gas phase at about 140 p. s. i. g. so that the methyl chloride can be condensed with water in the final step and, accordingly, the temperature in the scrubbing towers must be kept at about 130° F. to avoid condensation within the towers. The acid is continuously circulated through the towers in order to keep the packing therein well wetted with acid. The acid treating system also has the function of removing dimethyl ether and methanol which may be formed by hydrolysis of methyl chloride. It can be thus used in an emergency to remove from the system these impurities formed with fresh alumina gel in the driers. (These impurities do not separate from methyl chloride by ordinary distillation.) Traces of sulfur dioxide may be removed by means of a solid caustic cartridge 40. Fresh acid is added periodically to scrubber 37, the spent acid from this tower being transferred to acid treater 38 after removal of a corresponding amount of spent acid from the latter.

Acid treatment as just described is essentially a factor of safety in the operation of the process. If distillation tower 31 is high enough, i. e., has a sufficient number of plates and enough reflux is used, the methyl chloride withdrawn for use as catalyst solvent may be sufficiently pure for this use. In this event, the acid treatment of the methyl chloride could be by-passed and the latter sent directly to the catalyst preparation system.

The treated methyl chloride vapors are subjected to a distillation treatment in the redistillation column 41 in order to separate the methyl chloride from possible polymer. The purified methyl chloride is taken overhead from redistillation column 41 and sent into the catalyst preparation and storage system wherein it is condensed, cooled to about 0° F., contacted with aluminum chloride or other Friedel-Crafts type catalyst to form a catalyst solution of the desired strength which is then stored, preferably after cooling to about —100° F., for use in the polymerization reaction. The polymer is separated in the bottoms which are withdrawn from the redistillation column 41 at 42.

The bulk of the recycle materials are withdrawn from the methyl chloride distillation column as bottoms and are pumped through line 43 to recycle redistillation column 44. The primary purpose of the column 44 is to redistill the recycle materials before returning them to the reactor to remove polymers, which are poisons to the reaction, and to remove isoprene so that it can be recovered and metered into the system in a concentrated form for control purposes. Another very important function of column 44 is to provide a purge of C₄ compounds other than isobutylene from the recycle system at such a rate that their concentration in the reactor liquid will remain at some low and uniform level. The recycle redistillation column 44 contains a moderate number of bubble trays and the redistillation is carried out with a relatively low reflux ratio (about 1.0 to 1.5 O/P). Most of the feed to tower 44, for example, 95–98%, is taken overhead as redistilled product consisting mainly of methyl chloride and isobutylene. It is condensed at 45 and pumped from the reflux drum 46 into the mixed feed storage 50 through line 14.

A fixed amount of material which is equal to at least three times the amount of C₅ and heavier hydrocarbons in the feed is continuously withdrawn from the bottom of the tower 44. The fractionation is deliberately carried out at a low efficiency so that essentially all of the C₅ and heavier compounds are removed in the bottoms but the separation between the various C₄ hydrocarbons is relatively poor. By this means, the bottoms contain a considerable amount of C₄ and lighter materials of all types present in the feed, though the more volatile components are present to a lesser degree. Isobutane, the most volatile of the C₄ hydrocarbons, can thus be eliminated continuously from the system at a rate high enough to prevent an appreciable build-up of this material in the recycle stream. In a like manner, the other C₄ "impurities," butene-1 and butene-2, are eliminated from the system at a rate to prevent their build-up to any deleterious concentration level. Some methyl chloride and considerable isobutylene are also unavoidably withdrawn in the tower bottoms. The methyl chloride is at a relatively low concentration because it is more volatile than the C₄ compounds, but it is recovered from the bottoms stream in a supplementary tower. The amount of isobutylene, while large in comparison with the quantities of the other hydrocarbons, is small compared with the total quantity of isobutylene used in the process.

The bottoms are withdrawn from tower 44 and passed successively through two packed fractionating columns to complete the elimination of the impurities. In column 46, the small amount of methyl chloride in the bottoms stream from redistillation column 44 is taken overhead under a very high reflux ratio to give a high recovery of methyl chloride from the heavier hydrocarbons. The overhead, containing only a small amount of C₄ hydrocarbons, is returned to the recycle system as by passing it through line 47 to the interstage of the recycle gas compression.

The bottoms are withdrawn from column 46 and are fed through line 48 to the second packed fractionating or purge tower 11 where the C₄ compounds are separated as completely as possible from the C₅ hydrocarbons. The C₄ overhead from purge tower 11, containing chiefly isobutylene but also most of the other C₄ compounds removed from the recycle stream in the main redistillation step is discarded from the system through line 49 by sending it back to the isobutylene extraction process, preferably after combining it with the bottoms from the isobutylene redistillation column 6.

The bottoms from purge tower 11 contain most of the unreacted isoprene, any other C₅ compounds which were introduced into the system with the fresh isoprene feed stream and all heavier materials such as low molecular weight polymers. In some cases, this stream is discarded either to slop or back to the diolefin extraction unit as at 51 thereby avoiding any build-up of C₅ impurities in the reactor feed stream. In other cases, however, it is desirable to recover the isoprene from the bottoms from purge tower 11 so that it can be recycled back to the reactor. This is done by adding a portion of the bottoms stream to the fresh isoprene stream in line 52 whereupon the combined streams are subjected to redistillation in column 10 to free the isoprene of polymer and prepare a stream of freshly redistilled isoprene for introduction into the mixed feed storage 50. The remaining portion of the bottoms stream must be discarded to slop or back to the diolefin extraction unit in order to permit a regular purge of C₅ compounds other than isoprene. By purging a controlled amount of this bottoms stream, the equilibrium concentration of the C₅ "impurities" in the reactor stream is held to a low and uniform level.

Figure 2 shows the modifications which are necessary in the recycle system when ethyl chloride is used as catalyst solvent and diluent. In this embodiment, the compressed and dried recycle gas is passed into the knockout drum 101 in order to separate entrained lubricating oil from the compressors, whereupon the recycle is fed into recycle distillation column 102. This column is operated in such a manner as to permit withdrawal of substantially all of the isobutylene and a major proportion of the ethyl chloride as overhead which is condensed at 103, passed into reflux feed drum 104 and is withdrawn therefrom and passed to the mixed feed storage through line 105.

The bottoms from distillation column 102 are passed into distillation column 106 wherein the recycle bottoms are redistilled. The redistillation in column 106 is so conducted that all the C₄'s and substantially all the ethyl chloride are taken overhead while the bottoms contain a small proportion of ethyl chloride, the isoprene and other C₅'s as well as higher boiling materials, polymer, etc.

The overhead from column 106 is condensed at 107 and flows into reflux feed drum 108 whence it is withdrawn through line 109 and passed to distillation column 110 wherein it is subjected to fractionation to remove substantially all of the C₄'s as overhead which serves as a C₄ purge for the system, the purge stream discharged at 111 passing either to waste or to the isobutylene plant.

The ethyl chloride removed as bottoms from the distillation column 110 should be as free as possible from C₄ olefinic materials and is passed through line 112 to an acid treating system such as is described above for Figure 1 in order to reduce the amount of olefinic materials to a low figure, whereupon the purified ethyl chloride is utilized for the preparation of catalyst solution as described above for methyl chloride.

The bottoms from recycle redistillation column 106 are withdrawn through line 113 and passed to distillation column 114 wherein they are fractionated to separate as overhead, the small amount of ethyl chloride contained therein, the ethyl chloride overhead being passed through line 115 to the inlet to distillation column 106 for return to the system.

The bottoms from this distillation contain the isoprene, other C₅'s and higher boiling materials such as polymer and correspond essentially to the bottoms from distillation column 11 of Figure 1 and are similarly treated, i. e., discarded completely as at 116 either as slop or sent back to the diolefin extraction unit or discarded in part, the remainder being combined with fresh isoprene feed in line 117 and sent to distillation column wherein it is fractionated to separate a stream of freshly distilled polymer-free isoprene for introduction into the fresh feed storage.

The recycle purification system in accordance with the present invention is applicable to processes wherein isoolefinic materials alone or mixtures of isoolefinic materials with diolefinic materials are polymerized in contact with solutions of Friedel-Crafts type catalysts dissolved in lower molecular weight alkyl halides, i. e., alkyl halides containing less than about 5 carbon atoms per molecule as well as in the presence of varying additional amounts of such alkyl halides as diluents for the reaction mixture and wherein considerable amounts of diolefin and/or isoolefin is unpolymerized. Isobutylene is the preferred isoolefin although other isomonoolefins containing up to 8 carbon atoms per molecule may be used. Isoprene and dimethyl butadiene are the preferred diolefinic materials, although other diolefins such as butadiene, piperylene as well as higher diolefins containing up to about 12-14 carbon atoms per molecule, such as myrcene and certain non-conjugated diolefins such as dimethylallene and the like may be used. The ratio of isoolefin to diolefin used in the preparation of copolymers is from about 50-95 weight per cent of isoolefin to about 50 to 5 weight per cent of diolefin when the latter is a C$_4$ diolefin. With C$_5$ and higher diolefins, the amount of diolefin is less than 10 weight per cent and preferably less than 5 weight per cent of the liquid isoolefin-diolefin mixture. The reactants, catalysts, solvents and the like and the conditions applied in the polymerization reaction are described in considerable detail in Mueller-Cunradi et al. U. S. Patent No. 2,203,873 and in the Australian Patent No. 112,875, issued July 31, 1941.

It may readily be seen from the foregoing description that the recycle system of the present invention provides the art with a convenient method of recovering valuable reactants and diluents for reuse in the process and at the same time reduces or controls the amount of impurities present in the system to a sufficiently low level to permit continuous operation of the process without detrimental effect upon the quantity or quality of the product formed.

The foregoing description contains a limited number of embodiments of the present invention but it will be understood that this invention is not limited to the specific details described since numerous variations are possible without departing from the purview of this invention as defined in the following claims.

What we claim and desire to secure by Letters Patent is:

1. In the process of preparing solid rubberlike materials by polymerizing an isomonoolefin in an alkyl chloride diluent containing less than 5 carbon atoms per molecule at a temperature below about —40° C. in contact with a Friedel-Crafts type catalyst dissolved in an alkyl chloride containing less than 5 carbon atoms per molecule, the improvement which comprises flashing off the low boiling materials associated with the solid polymer particles by dropping the polymer and said materials into water in a flashing zone at about 150° F., withdrawing recycle gas from the flashing zone, cooling, compressing and drying the recycle gases, subjecting the recycle gases to fractionation, separating a fraction consisting principally of isoolefin and diluent and recycling it to feed storage for the polymerization reaction, separating at least one fraction rich in hydrocarbon impurities and discarding the same from the system, separating a further fraction sufficiently free of olefinic materials and containing substantially enough alkyl chloride to suffice for the preparation of catalyst solution and dissolving a Friedel-Crafts type catalyst therein for addition to the polymerization reaction.

2. In the process of preparing solid rubberlike materials by polymerizing an isoolefin in methyl chloride as diluent at temperatures below about —40° C. in contact with a Friedel-Crafts type catalyst dissolved in methyl chloride, the improvement which comprises flashing off the low-boiling materials associated with the solid polymer particles by dropping the polymer and said materials into water in a flashing zone at about 150° F., withdrawing recycle gas from the flashing zone, cooling, compressing and drying the recycle gases, subjecting the treated recycle gases to fractionation, removing overhead the small amount of methyl chloride needed for preparation of catalyst solution, subjecting the removed methyl chloride to an acid treatment if necessary to remove olefinic materials from the methyl chloride and preparing catalyst solution with this methyl chloride, subjecting the bottoms from this distillation to a further distillation to separate a fraction containing the bulk of the isoolefin and methyl chloride from a fraction containing the bulk of the impurities, discarding the latter and recycling the fraction containing the bulk of the isoolefin and methyl chloride to the polymerization reaction.

3. In the process of preparing solid rubberlike materials by polymerizing an isoolefin in ethyl chloride as diluent at temperatures below about —40° C. in contact with a Friedel-Crafts type catalyst dissolved in ethyl chloride, the improvement which comprises flashing off the low boiling materials associated with the solid polymer particles by dropping the polymer and said materials into water in a flashing zone at about 150° F., withdrawing recycle gas from the flashing zone, cooling, compressing and drying the recycle gases, subjecting the treated recycle gases to fractionation, removing overhead substantially all the isoolefin and the major proportion of the ethyl chloride contained in the recycle gases and passing this overhead to the feed storage for the polymerization reaction, subjecting the bottoms from this fractionation to a further fractionation taking overhead the ethyl chloride, C$_4$ and lighter hydrocarbons, purging this overhead of the bulk of the hydrocarbons and subjecting the remaining ethyl chloride to an acid treatment to remove any residual olefinic materials and preparing catalyst solution from the resultant purified ethyl chloride for reuse in the polymerization reaction.

4. In the process of preparing solid rubberlike materials by copolymerizing isobutylene and a diolefin containing about 5 to 12 carbon atoms per molecule in methyl chloride as diluent at temperatures below about —40° C. in contact with a Friedel-Crafts type catalyst dissolved in methyl chloride, the improvement which comprises flashing off the low boiling materials associated with the polymer by dropping the polymer and said materials into water in a flashing zone at about 150° F., withdrawing the flashed gases for recycling from the flashing zone, cooling, compressing and drying the recycle gases, subjecting the treated recycle gases to fractionation, removing overhead the small amount of methyl chloride needed for preparation of catalyst solution, subjecting the removed methyl chloride to an acid treatment if necessary to remove olefinic materials therefrom and preparing catalyst solution with this methyl chloride, subjecting the bottoms from this distillation to a further distillation to separate a fraction containing the bulk of the isoolefin and methyl chloride from a fraction containing the bulk of the diolefin and impurities, subjecting the latter fraction to distillation to separate a fraction containing the principal part of the diolefins, recycling at most only part of the diolefin fraction to the mixed feed storage for the polymerization reaction and recycling said fraction containing the bulk of the isobutylene and diolefin to the mixed feed storage.

5. In the process of preparing solid rubber-like materials by copolymerizing isobutylene and a diolefin containing about 5 to 12 carbon atoms per molecule in ethyl chloride as diluent at temperatures below −40° C. in contact with a Friedel-Crafts type catalyst dissolved in ethyl chloride, the improvement which comprises flashing off the low boiling materials associated with the polymer by dropping the polymer and said materials into water in a flashing zone at about 150° F., withdrawing the flashed gases for recycling from the flashing zone, cooling, compressing and drying the recycle gases, subjecting the treated recycle gases to fractionation, removing overhead substantially all the isobutylene and the major proportion of the ethyl chloride contained in the recycle gases, passing this overhead to the mixed feed storage for the polymerization reaction, subjecting the bottoms from this fractionation to a further distillation taking overhead the ethyl chloride, $C_4$ and lighter hydrocarbons, purging the overhead of the bulk of the hydrocarbons and subjecting the remaining ethyl chloride to an acid treatment to remove any residual olefinic materials and preparing catalyst solution by dissolving a Friedel-Crafts type catalyst therewith for reuse in the polymerization, subjecting bottoms from the last named distillation to a fractionation removing the diolefin as bottoms, discarding a sufficient amount of bottoms to reduce the $C_5$'s and other impurities to a tolerable amount and recycling the undiscarded diolefinic bottoms to the mixed feed storage.

6. In the process of preparing solid, rubberlike polymers by the copolymerization of a major proportion of isobutylene and a minor proportion of isoprene at temperatures of about −140° F. in the presence of a solution of aluminum chloride in methyl chloride, the improvement which consists of flashing off the low boiling materials associated with the solid polymer particles by dropping the polymer and said materials into water in a flashing zone at about 150° F., cooling the recycle gases withdrawn from the flashing zone to a temperature sufficiently low to remove part of the water vapor contained in said recycle gases, compressing the recycle gases to a pressure of about 35–40 p. s. i. g., removing further amounts of water from the compressed gases by cooling to about 65° F., passing the gases through a gel-type adsorber drier to remove any additional water remaining in the recycle gases, further compressing the dried gases to about 160 p. s. i. g., subjecting the gases to distillation to remove overhead the small amount of methyl chloride needed for preparation of catalyst solution, subjecting the overhead to treatment to remove olefinic materials from the methyl chloride and preparing catalyst solution with the resultant purified methyl chloride, subjecting the bottoms from this distillation to a redistillation to separate he bulk of the methyl chloride and isobutylene in the recycle as overhead which is sent to the mixed feed storage from the bottoms containing isoprene and other $C_4$, $C_5$ and higher hydrocarbons, subjecting the bottoms from this redistillation to further distillation to recover the methyl chloride contained therein as overhead which is returned to the recycle, and separate an isoprene-containing bottoms, subjecting the isoprene-containing bottoms to separate $C_4$ hydrocarbons contained therein as an overhead fraction which is withdrawn from the system and a bottoms fraction, discarding at least a part of this bottoms fraction to prevent build-up of $C_5$ impurities in the system, subjecting the remainder of this bottoms fraction to a further distillation to separate polymers from the isoprene which is then fed to the mixed feed storage and recycled to the reaction.

7. The process as defined in claim 6 wherein fresh isobutylene is redistilled to a high degree of purity and continuously added to the mixed feed storage and fresh isoprene feed is washed with water to remove oxygenated impurities, polymerization inhibitor is added to the washed isoprene which is then combined with the undiscarded part of the bottoms fraction, subjected to distillation to separate polymers from an isoprene-rich fraction which is taken overhead, condensed and fed into the mixed feed storage.

ARTHUR D. GREEN.
STANLEY C. LANE.
EDWARD T. MARSHALL.